United States Patent
Brown et al.

[11] Patent Number: 6,158,418
[45] Date of Patent: Dec. 12, 2000

[54] METHOD FOR BALANCING THE AIR/FUEL RATIO TO EACH CYLINDER OF AN ENGINE

[75] Inventors: Scott C. Brown, Peoria, Ill.; Martin L. Willi, Lafayette, Ind.

[73] Assignee: Caterpillar Inc., Peoria, Ill.

[21] Appl. No.: 09/388,575

[22] Filed: Sep. 1, 1999

Related U.S. Application Data

[62] Division of application No. 09/036,348, Mar. 6, 1998, Pat. No. 6,000,384.

[51] Int. Cl.[7] ...................................... F02M 7/00
[52] U.S. Cl. ................................................ 123/435
[58] Field of Search .................... 123/676, 435, 123/436

[56] References Cited

U.S. PATENT DOCUMENTS

| | | | |
|---|---|---|---|
| 4,641,625 | 2/1987 | Smith | 123/575 |
| 4,834,054 | 5/1989 | Hashimoto et al. | 123/676 |
| 4,955,326 | 9/1990 | Helmich | 123/27 GE |
| 5,036,669 | 8/1991 | Earleson et al. | 60/602 |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,158,063 | 10/1992 | Hosoda et al. | 123/676 |
| 5,224,457 | 7/1993 | Arsenault et al. | 123/526 |
| 5,398,724 | 3/1995 | Vars et al. | 137/625.33 |
| 5,404,719 | 4/1995 | Araki et al. | 123/676 |
| 5,450,829 | 9/1995 | Beck | 123/435 |
| 5,526,786 | 6/1996 | Beck et al. | 123/357 |
| 5,544,639 | 8/1996 | Shouda et al. | 123/676 |
| 5,842,459 | 12/1998 | Akagi et al. | 123/676 |
| 6,000,384 | 12/1999 | Brown et al. | 123/676 |

FOREIGN PATENT DOCUMENTS

| | | |
|---|---|---|
| 3538668A1 | 5/1987 | Germany . |
| 60195349 | 3/1985 | Japan . |
| 2230874A | 10/1990 | United Kingdom . |
| WO9747867 | 12/1997 | WIPO . |

*Primary Examiner*—John Kwon
*Attorney, Agent, or Firm*—R. Carl Wilbur

[57] ABSTRACT

A method for controlling delivery of fuel to each cylinder of an engine by adjusting the appropriate fuel valve duration times to each such cylinder based upon a predetermined detonation level. By using the detonation level measurements from each individual cylinder as a controlling parameter, the delivery of fuel to that particular cylinder can be trimmed to achieve the predetermined detonation level. Balancing the detonation level for each such cylinder to a common detonation level likewise produces a substantially identical air/fuel ratio in each such cylinder. The detonation control loop can be initiated at predetermined intervals so as to continuously maintain a balanced air/fuel ratio to each cylinder in any particular engine.

9 Claims, 7 Drawing Sheets

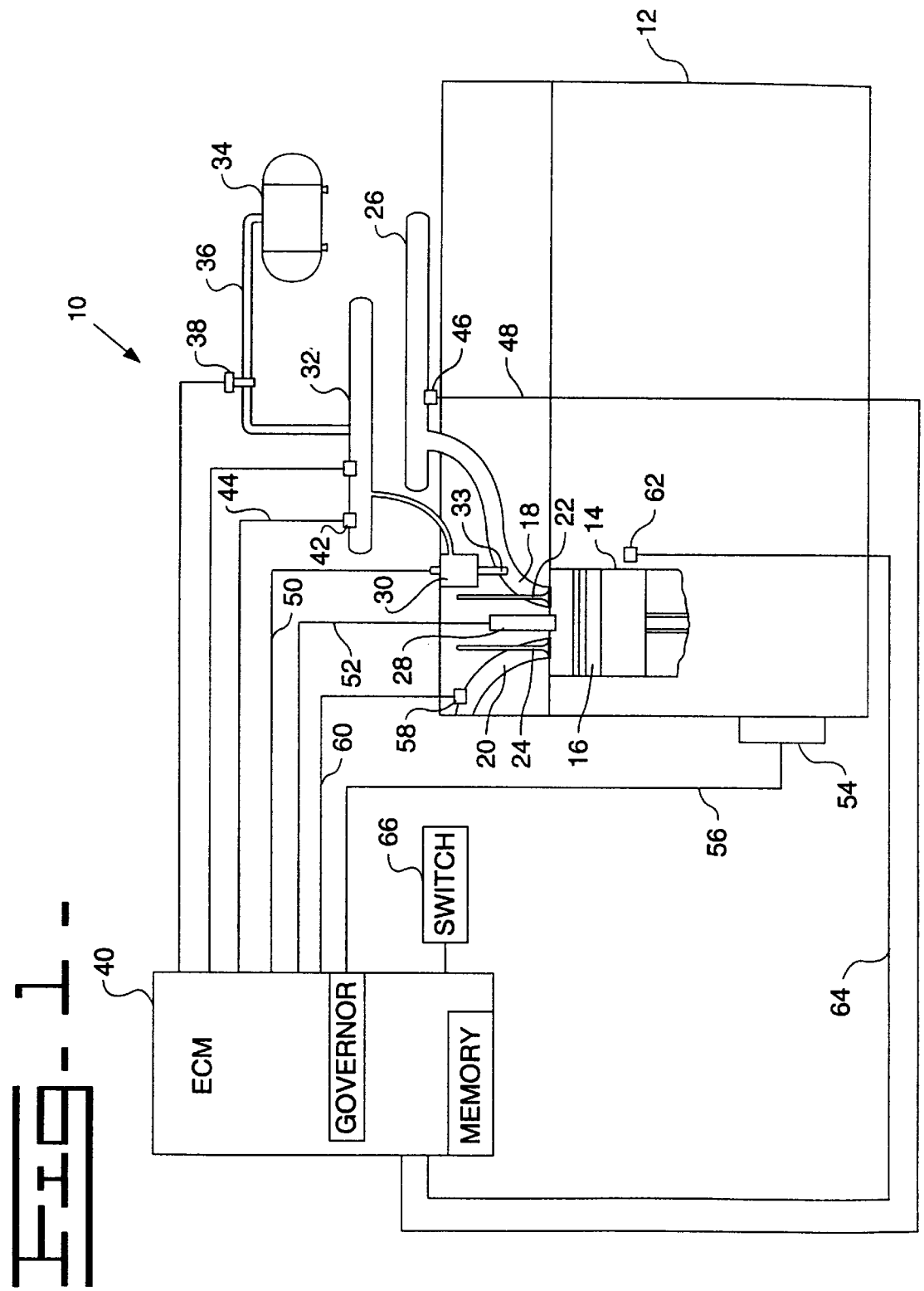

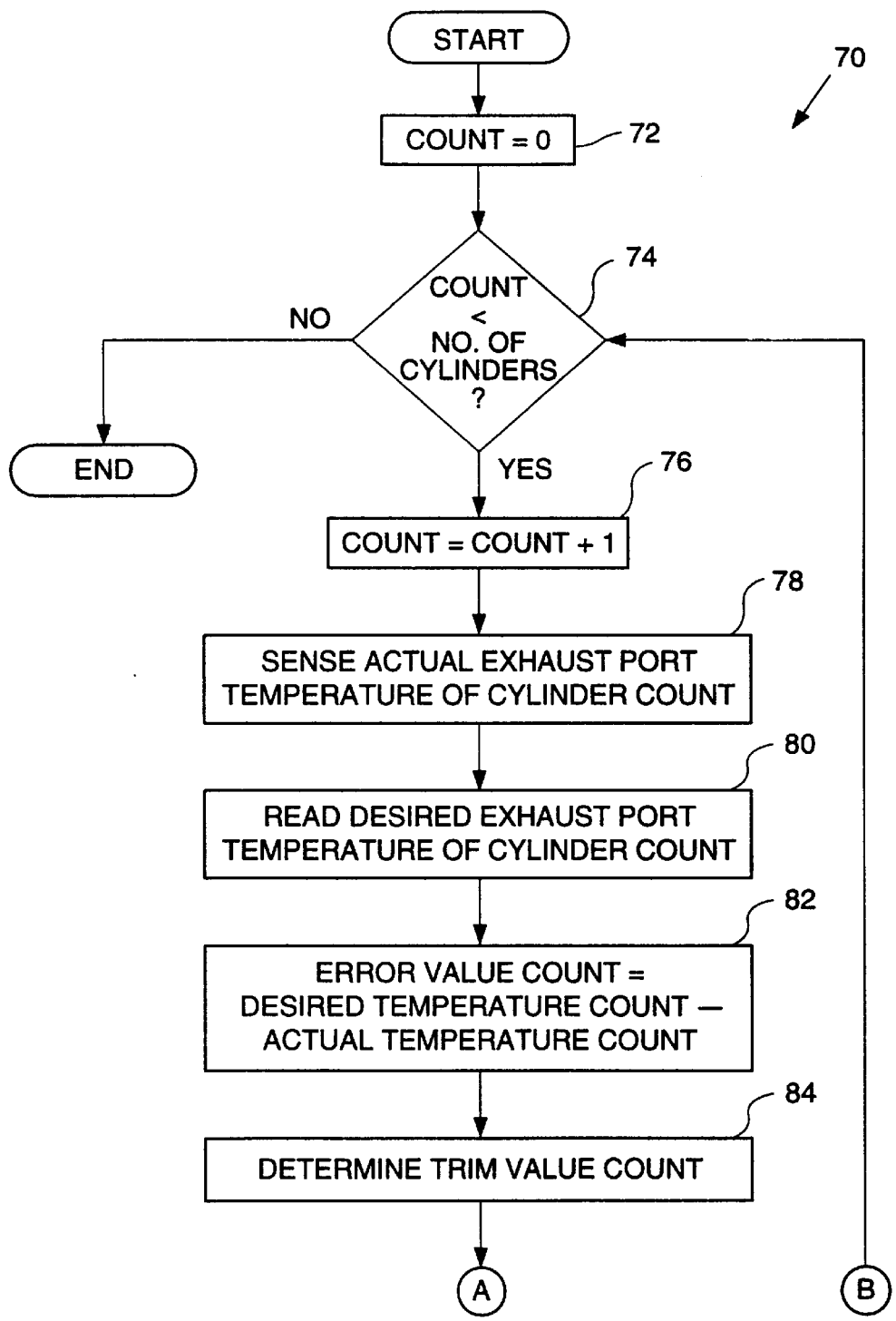
Fig_2a_

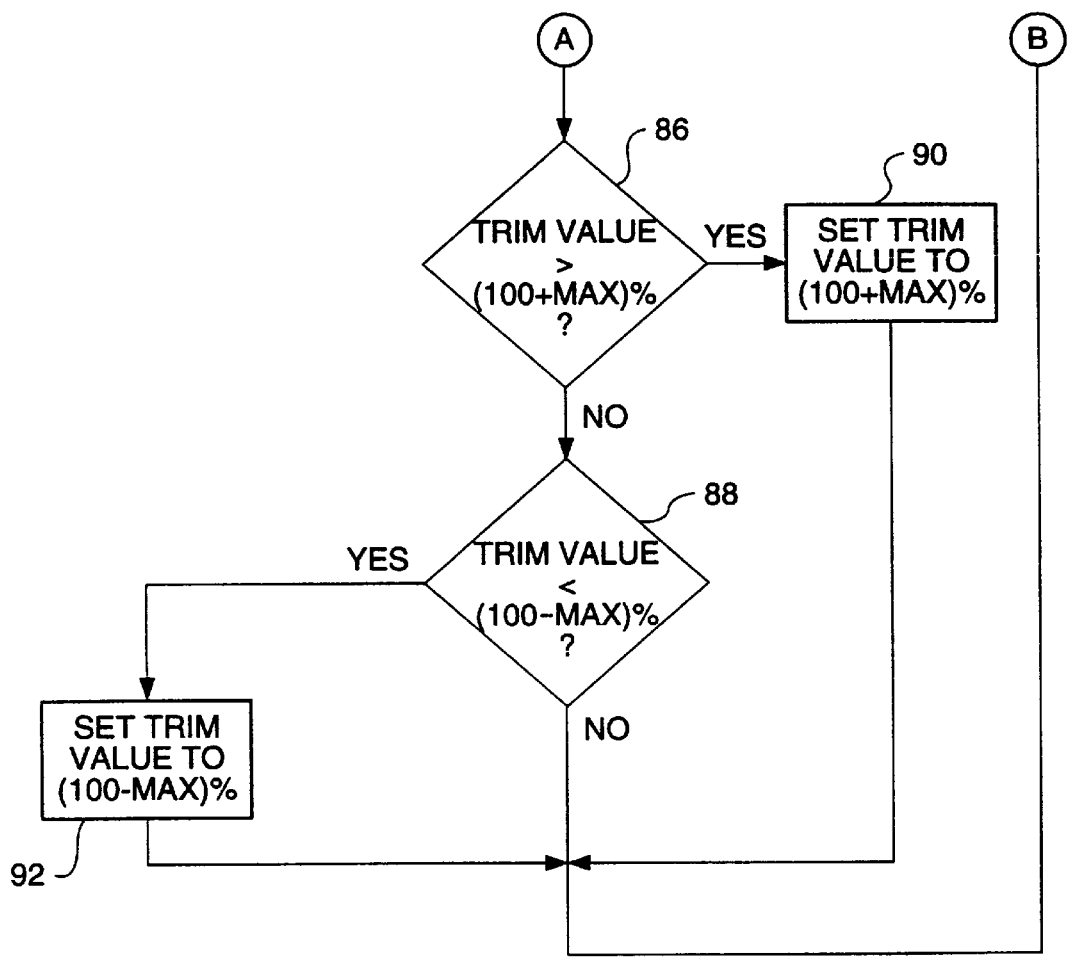
Fig_2b_

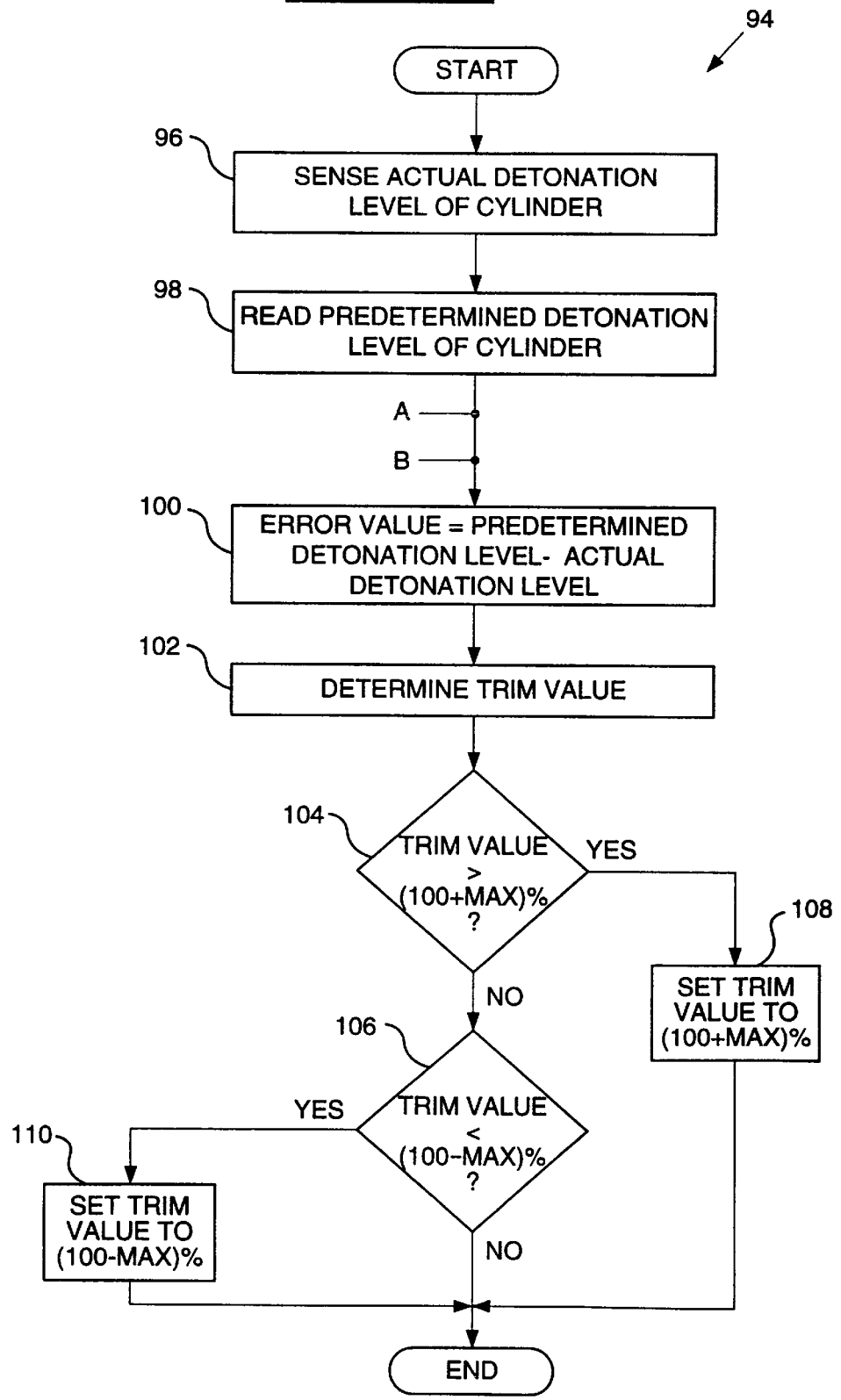

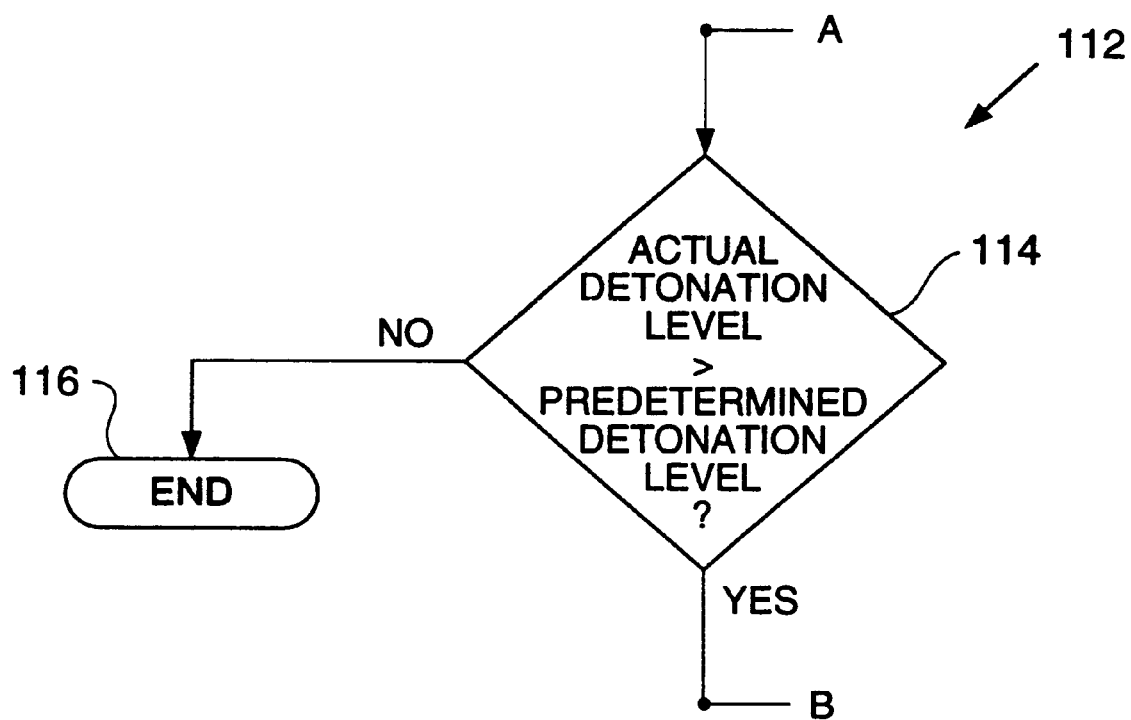
Fig_4_

METHOD FOR BALANCING THE AIR/FUEL RATIO TO EACH CYLINDER OF AN ENGINE

This is a divisional application of application Ser. No. 09/036,348, filed Mar. 6, 1998 now U.S. Pat. No. 6,000,384.

TECHNICAL FIELD

This invention relates generally to internal combustion engines and, more particularly, to a method for individually balancing the air/fuel ratio to each cylinder associated with a particular internal combustion engine such as a dual fuel engine. The present method involves adjusting the air/fuel mixture to each cylinder based upon an analysis of the exhaust port temperature and/or detonation level associated with each individual cylinder.

BACKGROUND ART

Internal combustion engines can be fueled solely by a liquid fuel or, in the case of dual fuel engines, by both a gaseous and liquid fuel. Although the present methods are equally applicable to engines fueled solely by liquid fuel, the present methods will be discussed and explained primarily in the context of a dual fuel engine.

A dual fuel engine can typically operate in two modes, namely, a dual fuel mode (gaseous fuel and liquid fuel) and a liquid fuel mode. In a strictly liquid fuel mode, a liquid fuel, such as diesel fuel, is injected directly into an engine cylinder or a precombustion chamber as the sole source of fuel and energy during combustion. In a dual fuel mode, a gaseous fuel, such as natural gas, is controllably released into an air intake port of the particular cylinder where the gaseous fuel is mixed with air. After a predetermined period of time, a small amount or pilot amount of diesel fuel is injected directly into the cylinder or precombustion chamber in order to ignite the mixture of air and gaseous fuel. Compression of the air/fuel mixture during the compression stroke ignites the liquid fuel which in turn ignites the air/gaseous fuel mixture.

In an internal combustion engine, it is sometimes assumed that the air/fuel mixture to each cylinder is homogeneous. In actuality, of course, the air/fuel mixture to each cylinder is non-homogeneous due to many factors such as variations in manufacturing as well as differences in the operating characteristics of the injectors and/or valves used to control fuel delivery to each individual cylinder. If the control signals used to deliver fuel to different cylinders are of the same duration, such variations can result in different air/fuel ratios within different cylinders.

Detonation is an unacceptable increase in the rate of cylinder pressure and typically occurs when the air/fuel mixture in a particular cylinder is too rich for the current engine operating conditions. Detonation above a predetermined threshold level can cause damage to the cylinder walls, piston, piston rings, valves and other components associated with each individual cylinder. Generally, detonation can be controlled by monitoring and adjusting the air/fuel mixture to each respective cylinder.

It is therefore desirable to control and adjust the air/fuel mixture to each cylinder such that the air/fuel ratio associated with each cylinder will be substantially similar. It is also desirable to reduce the frequency of detonation occurring in any particular cylinder. This can likewise be achieved by controlling and adjusting the air/fuel ratio to each cylinder. Still further, it is likewise desirable to improve fuel economy and reduce emissions.

Accordingly, the present invention is directed to overcoming one or more of the problems as set forth above.

DISCLOSURE OF THE INVENTION

In one aspect of the present invention, a method for controlling the air/fuel mixture being delivered to each individual cylinder in a particular engine using the exhaust port temperature of each such cylinder as a controlling parameter is provided. This particular method may be used during both the dual fuel mode or the liquid fuel mode of operation of a dual fuel engine and the control loop performing the operational steps of this method are executed in one cylinder at a time at a predetermined rate or interval. This method includes sensing the actual exhaust port temperature of the particular cylinder under investigation, comparing the actual exhaust port temperature to a desired exhaust port temperature and thereafter generating an individual error value for that cylinder based upon such exhaust port temperature comparison. Based upon the error value generated, a distinct trim value for that particular cylinder is produced, this trim value being indicative of a percentage (%) adjustment factor which is applied to the appropriate fuel valve control signal duration time for such cylinder depending upon the particular mode of operation of the engine. If the dual fuel engine is in the liquid or diesel mode, the computed trim value (%) is applied to the cylinder's liquid fuel injector control signal duration time and, in effect, changes the fuel injector control signal duration time so as to control the liquid fuel flow to that individual cylinder. On the other hand, if the dual fuel engine is operating in the dual fuel mode, the computed trim value (%) is applied to the cylinder's gaseous fuel admission valve control signal duration time thereby, in effect, adjusting the gaseous fuel injector control signal duration time for that particular cylinder. Controlling the delivery of fuel individually to each particular cylinder likewise controls the air/fuel mixture for that particular cylinder and balancing the exhaust port temperature for each such cylinder to a common desired exhaust port temperature likewise corresponds to a balanced air/fuel ratio in all cylinders. By using the exhaust port temperature measurements from each engine cylinder as a controlling parameter, the fuel command to that particular cylinder can be trimmed to achieve the desired exhaust port temperature.

In another aspect of the present invention, a method for controlling the air/fuel mixture to a particular cylinder of an engine by sensing the detonation level associated with such cylinder is provided. This particular method is utilized when the dual fuel engine is operating in the dual fuel mode and the control loop which accomplishes this analysis will be preferably executed in each individual cylinder every time that cylinder is fired. This method includes sensing an actual detonation level associated with the particular cylinder under investigation and comparing the actual detonation level with a predetermined or desired detonation level. Based upon this comparison, an individual error value is generated for that particular cylinder. Based upon this error value, a distinct trim value for that particular cylinder is likewise produced, this trim value also being indicative of a percentage adjustment factor which is applied to the cylinder's gaseous fuel admission valve control signal duration time so as to change the control signal duration time. Controlling the delivery of fuel individually to each particular cylinder again likewise controls the air/fuel mixture for that particular cylinder and balancing the detonation level for each such cylinder to a common desired detonation level likewise corresponds to a balanced air/fuel ratio in all cylinders. By using the detonation level measurement from each engine cylinder as a controlling parameter, the fuel command to that particular cylinder can be trimmed to achieve a predetermined desired detonation level in all cylinders. Here again, only those cylinders which need trimming based upon the predetermined desired detonation level are, in fact, trimmed.

In still another aspect of the present invention, the detonation control loop can likewise be utilized to ensure that all cylinders of a particular engine are operating below a predetermined threshold detonation level. In this particular application, the present method includes sensing the actual detonation level associated with the particular cylinder under investigation and comparing such actual detonation level with a predetermined or threshold detonation level. Based upon this comparison, if the actual detonation level for that particular cylinder is greater than the predetermined threshold level, an error value is generated for that particular cylinder. A distinct trim value for that particular cylinder is then produced based upon the error value generated so as to bring the detonation level within limits. This trim value is likewise indicative of a percentage (%) adjustment factor which is applied to the cylinder's gaseous fuel admission valve control signal duration time so as to change the control signal duration time. If the actual detonation level for the cylinder is less than the predetermined threshold detonation level, no trim change occurs. By comparing the actual detonation level of each engine cylinder to a common predetermined threshold detonation level, the fuel command to any particular cylinder can be trimmed to reduce the detonation level for that particular cylinder to below the threshold level. Here again, only those cylinders which are operating at an air/fuel mixture which results in a detonation level greater than the threshold level are trimmed.

In still a further aspect of the present invention, the above aforementioned methods can be utilized in conjunction with one another in a dual fuel engine when the dual fuel engine is operating in a dual fuel mode. In this particular situation, the trim value produced from a comparison of the desired exhaust port temperature versus the actual exhaust port temperature is compared with the trim value, if any, produced by a comparison of the predetermined detonation level versus the actual detonation level associated with a particular cylinder and the smallest of the compared trim values is selected. This smallest or minimum compared trim value is then applied to the cylinder's gaseous fuel admission valve control signal duration time so as to adjust the duration time accordingly. Gaseous fuel is then delivered to that particular cylinder in an amount which achieves a substantially balanced air/fuel ratio in all cylinders based upon trimming all cylinders to a substantially common exhaust port temperature and trimming all such cylinders to either a substantially common detonation level, or trimming to a threshold detonation level wherein the detonation level in all cylinders is kept below the predetermined threshold level. In the case where the detonation control loop says subtract fuel from the particular cylinder under investigation and the exhaust port temperature control loop says add fuel to that particular cylinder, the detonation control loop will override the exhaust port temperature control loop.

A system for delivering, controlling and/or balancing the air/fuel ratio of each cylinder associated with a particular engine can be incorporated into an engine for operation in accordance with the teachings of the present invention.

BRIEF DESCRIPTION OF THE DRAWINGS

For a better understanding of the present invention, reference may be made to the accompanying drawings in which:

FIG. 1 is a schematic view of a dual fuel engine system constructed in accordance with the teachings of the present invention;

FIGS. 2A and 2B are a flowchart of operating steps for the dual fuel engine system of FIG. 1 constructed in accordance with one embodiment of the present invention wherein exhaust port temperature measurements from each engine cylinder are utilized as the controlling parameter;

FIG. 3 is a flowchart of operating steps for the dual fuel engine system of FIG. 1 constructed in accordance with another embodiment of the present invention wherein detonation level measurements from each engine cylinder is utilized as a controlling parameter;

FIG. 4 is a partial flowchart of operating steps to be incorporated in the flowchart of FIG. 3 constructed in accordance with still another embodiment of the present invention wherein a predetermined common threshold detonation level is utilized as a controlling parameter;

BEST MODE FOR CARRYING OUT THE INVENTION

Figure 5:
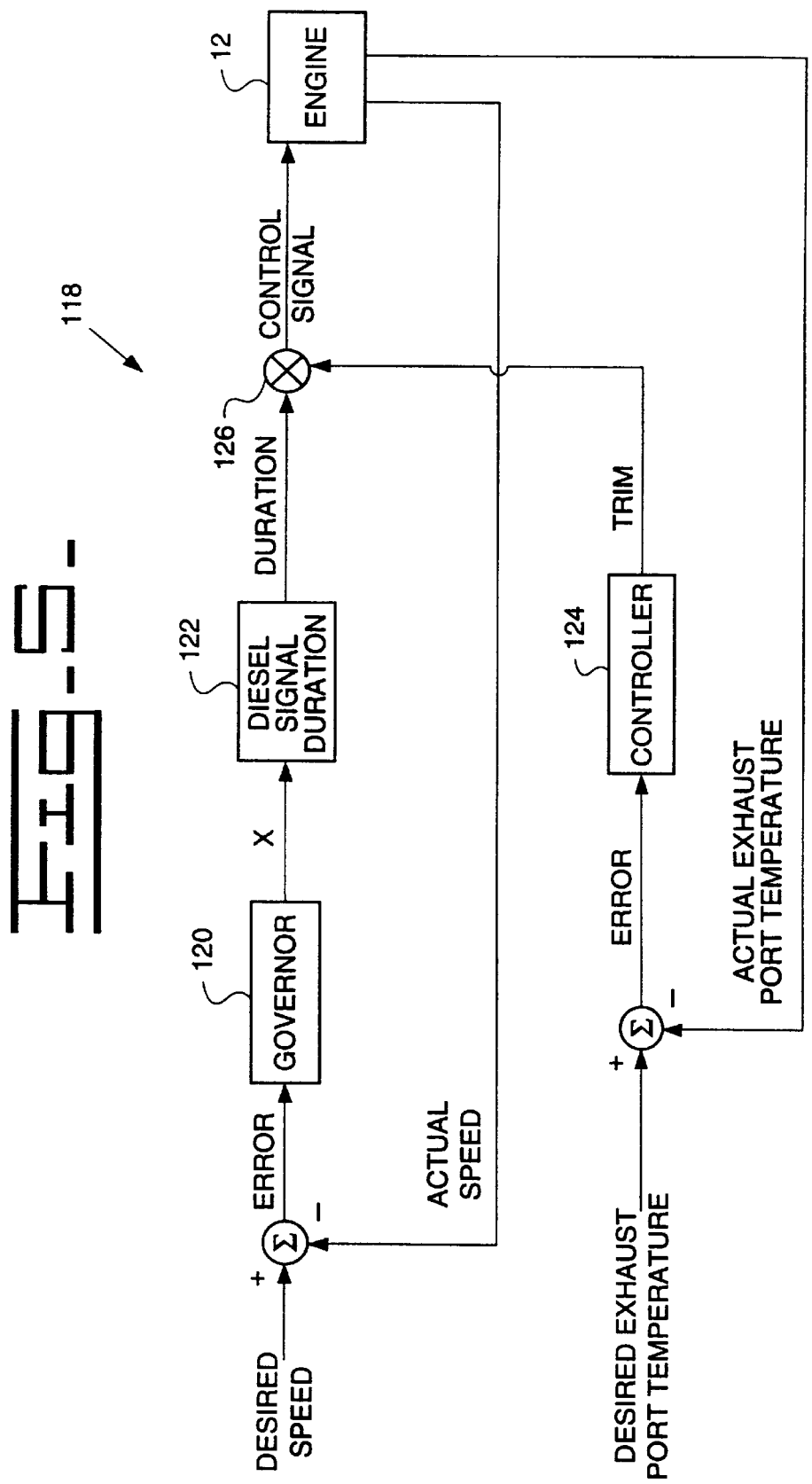
FIG. 5 is a control diagram of the present invention as illustrated in FIG. 2 when the particular engine is operating in a liquid fuel mode only.

Referring to the drawings, numeral 10 in FIG. 1 depicts a dual fuel engine system used in association with the present invention including an engine 12 having a representative cylinder 14 as shown. Although only one cylinder 14 is illustrated in FIG. 1, it is recognized that the total number of cylinders associated with engine 12 could vary and that engine 12 could be of the in-line type, V-type, or even a rotary type engine. Piston 16 is positioned for displacement within cylinder 14, cylinder 14 including an intake port 18 having a respective valve 22 associated therewith and an exhaust port 20 having a respective valve 24 associated therewith. Intake port 18 receives air from air manifold 26 to which intake air travels after passing through, for example, an air filter (not shown) and a turbocharger (not shown). Engine 12 also includes a fuel injector 28, such as an electronic unit injector, positioned for injecting liquid fuel, such as diesel fuel, into cylinder 14. The liquid fuel may be provided to fuel injector 28 by means commonly known in the art.

A gaseous fuel admission valve 30 is positioned between a gaseous fuel manifold 32 on the upstream side and an intake port 18 on the downstream side, the valve 30 including a nozzle portion 33 extending into intake port 18 for delivering gaseous fuel thereto. Gaseous fuel admission valve 30 may, for example, be of the type shown and described in U.S. Pat. No. 5,398,724 available from Woodward Governor Company. Gaseous fuel manifold 32 is connected to a source of gaseous fuel 34 by fuel path 36, a solenoid operated gaseous fuel shutoff valve 38 being positioned at an intermediate location along fuel path 36. Although not shown, it is recognized and anticipated that such a system might typically include a balance regulator positioned between gaseous fuel source 34 and gaseous fuel manifold 32 for regulating the gaseous fuel pressure at the upstream side of the gaseous fuel admission control valve 30.

An electronic control module (ECM) 40 is connected to a gaseous fuel pressure sensor 42 via conductive path 44 and to an intake air pressure sensor 46 via conductive path 48 for receiving pressure indicative signals from each of such sensors. Such pressure sensors are well known in the art and therefore a detailed description of such sensors is not included herein. ECM 40 is connected for controlling gaseous fuel admission valve 30 by conductive path 50 and is also connected for controlling fuel injector 28 by conductive path 52. In this regard, it is known to include driver circuitry within ECM 40 for delivering current control signals to such devices. However, it is recognized that such driver circuitry could be formed separate from, but connected to, ECM 40. An engine speed sensor 54 associated with a camshaft of engine 12 is also connected to ECM 40 via conductive path 56 for delivering engine speed indicative signals thereto. ECM 40 will typically include processing means, such as a microcontroller or microprocessor, associated electronic circuitry such as input/output circuitry, as well as associated memory.

An exhaust port temperature sensor 58 is positioned within the exhaust port 20 of cylinder 14 for sensing and monitoring the exhaust port temperature associated with cylinder 14. The exhaust port temperature sensor 58 is connected to ECM 40 via conductive path 60 for delivering exhaust port temperature indicative signals thereto. In addition, a detonation sensor 62 is positioned on engine 12 adjacent cylinder 14 for monitoring the detonation level within cylinder 14 and delivering detonation level indicative signals to ECM 40 via conductive path 64. Detonation sensor 62 could, for example, be an accelerometer or other noise/vibration detective device, the use of which is known in the art. Because many vibrations are produced by an engine, and because the frequency of cylinder detonation vibrations is typically a function of the engine bore size, ECM 40 might typically include bandpass filter circuitry, as is known in the art, to filter out noise from the detonation sensor signals. Each cylinder of engine 12 will include a temperature sensor such as sensor 58 and a detonation sensor such as sensor 62, although it is recognized that a given detonation sensor could be used to monitor more than one cylinder.

As noted above, dual fuel engine 12 can operate in a liquid fuel mode in which diesel fuel only is delivered to the engine cylinders by the liquid fuel injectors 28. Engine 12 can also operate in a dual fuel mode in which gaseous fuel, such as natural gas, is delivered to the engine cylinders by gaseous fuel admission control valves 30, and in which a small amount of diesel fuel is also delivered to the cylinders. In the dual fuel mode, the gaseous fuel is mixed with air in intake port 18 of cylinder 14 and a small amount or pilot amount of liquid fuel is injected into cylinder 14 in order to ignite the mixture of air and gaseous fuel. Typically control of the mode of engine operation may be via operator input to ECM 40 such as from a mode selection switch 66, as well as from other engine operating parameters sensed by ECM 40 such as engine speed and engine load.

Operating steps in accordance with one aspect of the present invention are set forth in flowchart 70 illustrated in FIGS. 2A and 2B. Such steps can be incorporated into the programming of the processing means of ECM 40 by techniques well known to those of ordinary skill in the art. The steps of flowchart 70 can be initiated while the engine is operating in either the liquid fuel mode or the dual fuel mode and such steps can be repeated at any predetermined rate or interval. Importantly, the control loop performing the operational steps of flowchart 70 is executed in one cylinder at a time at the predetermined rate or interval.

Once control loop 70 is initiated, the variable COUNT is set to zero at step 72. This stored COUNT is then compared to the total number of cylinders associated with engine 12 at step 74 and if the variable COUNT is less than the total number of engine cylinders, the variable COUNT is incremented by one at step 76. The actual exhaust port temperature associated with the cylinder under investigation is then sensed by temperature sensor 28 at step 78 and this temperature value is then stored in the memory associated with ECM 40. At step 80, ECM 40 reads the desired exhaust port temperature for the cylinder and compares the desired exhaust port temperature with the actual exhaust port temperature at step 82 and generates an error value representative of this comparison.

The desired exhaust port temperature is preferably the average exhaust port temperature of all of the cylinders as calculated by ECM 40. It is also recognized and anticipated that the desired exhaust port temperature may be determined from sensed engine parameters such as from a map based upon prior engine testing. Nevertheless, regardless of how the desired exhaust port temperature is actually derived, based upon the error value determined at step 82, ECM 40 determines a distinct trim value for that particular cylinder at step 84. The trim value determined in step 84 is a percent value indicative of an adjustment factor which will be applied to the control signal duration of the appropriate fuel injector or fuel admission valve within such cylinder depending upon the particular mode of operation of the engine 12. In general, if the actual exhaust port temperature is greater than the desired exhaust port temperature, such is indicative of delivery of more fuel than desired to the cylinder and the trim value determined will be a value intended to result in delivery of less fuel to the cylinder. If the actual exhaust port temperature is less than the desired exhaust port temperature, such is indicative of delivery of less fuel than desired to the cylinder and the trim value determined will be a value intended to result in delivery of more fuel to the cylinder.

In either case, the determined trim value is then compared with a maximum allowable trim change percentage so as to limit the trim change for any particular loop 70 to no more than a specified incremental change. This trim change limiting procedure is accomplished at steps 86 and 88 illustrated in FIG. 2B. For example, if it is determined that the maximum allowable trim change to any particular cylinder during any particular control loop 70 is ±5%, then the term MAX utilized in steps 86 and 88 will be equal to 5 and the overall percent range for the trim value determined in step 84 will be 105% (100+MAX) % in step 86 and 95% (100−MAX) % in step 88. If the determined trim value is less than the predetermined amount (100+MAX) in step 86, then such trim value is compared to the predetermined amount (100−MAX) at step 88. If the determined trim value is likewise greater than (100−MAX), then the trim value percentage determined at step 84 falls within the allowable range established by steps 86 and 88 and this trim value will then be applied to the appropriate control signal duration time as will be hereinafter explained. If the determined trim value is greater than the predetermined amount (100+MAX), ECM 40 will automatically set the trim value to the predetermined amount (100+MAX) at step 90 and this trim value will override the trim value determined at step 84. In similar fashion, if the trim value established at step 84 is less than the predetermined amount (100−MAX) set forth at step 88, then ECM 40 will set the trim value to (100−MAX) and this trim value will override the trim value determined at step 84.

If the dual fuel engine 12 is operating in its liquid or diesel mode, the computed trim value for a particular cylinder as determined as a result of control loop 70 is applied to the cylinder's liquid fuel injector 28 and, in effect, ECM 40 will multiply the liquid fuel injector control signal duration time by the trim value percentage and produce a trimmed control signal duration time. On the other hand, if the dual fuel engine 12 is operating in its dual fuel mode, the computed trim value percentage is applied to the control signal duration of the cylinder's gaseous fuel admission valve 30 thereby likewise adjusting the gaseous fuel valve control signal duration time for that particular cylinder.

Once control loop 70 is completed for a particular cylinder of engine 12, the variable COUNT is then compared with the total number of engine cylinders at 74 and if such variable COUNT is still less than the total number of engine cylinders, steps 76–92 are repeated for the next individual cylinder. This process continues until all of the individual cylinders associated with engine 12 are analyzed. When the variable COUNT at step 74 is equal to the number of engine cylinders, control loop 70 will end. At this point, all of the cylinders associated with engine 12 have been analyzed in accordance with control loop 70.

Control loop 70 balances each individual cylinder to the same desired exhaust port cylinder temperature. Trimming each individual cylinder to the same desired exhaust port cylinder temperature will result in each cylinder being trimmed to substantially the same air/fuel ratio. Even though each cylinder may be receiving more or less air and/or fuel as compared to other cylinders, once all engine cylinders are trimmed in accordance with control loop 70, the overall air/fuel ratio associated with each individual cylinder will be substantially identical. This results in all cylinders being balanced to a substantially identical air/fuel ratio. It is therefore preferred that control loop 70 be repeated at a predetermined interval so that ECM 40 can both monitor and maintain a balanced air/fuel ratio within each cylinder of a particular engine. This predetermined interval for repeating control loop 70 with respect to all of the cylinders associated with a particular engine can be based upon a specific predetermined period of time, a specific predetermined number of piston strokes, or some other engine parameter or other criteria.

An alternative method for balancing the air/fuel ratio within each cylinder of a particular engine is illustrated in flowchart 94 of FIG. 3. Here again, the operating steps set forth in flowchart 94 can be incorporated into the programming of the processing means of ECM 40 by techniques well known to those of ordinary skill in the art. The steps of flowchart 94 are operable only when the dual fuel engine is operating in its dual fuel mode and, preferably, such steps are repeated in each cylinder every time such cylinder is fired. In other words, the control loop performing the operational steps of flowchart 94 is executed in more than one cylinder simultaneously depending upon the particular timing of the engine 12. For purposes of clarity, control loop 94 will be discussed with respect to one cylinder, it being recognized and understood that control loop 94 may be occurring simultaneously with respect to any number of cylinders associated with a particular engine.

Once control loop 94 is initiated in a particular cylinder, the actual detonation level associated with that particular cylinder is sensed by that cylinder's respective detonation sensor 62 at step 96 and this detonation level measurement is then stored in the memory associated with ECM 40. At step 98, ECM 40 reads the desired detonation level measurement for all cylinders and compares the desired detonation level measurement with the actual detonation level measurement at step 100. Based upon this comparison ECM 40 generates an error value. The predetermined or desired detonation level measurement can be a level which is determined based upon prior engine testing, or such level could be the average detonation level of all of the cylinders based upon the current engine operating conditions as calculated by ECM 40. Based upon the error value determined at step 100, ECM 40 determines a distinct trim value percentage for that particular cylinder at step 102, this trim value likewise being indicative of an adjustment factor which will be applied to the gaseous fuel admission valve control signal duration within such cylinder. This trim value is then compared at steps 104 and 106 to a maximum allowable trim change percentage so as to again limit the trim change for any particular loop 94 to a specific incremental change. Steps 104, 106, 108 and 110 of control loop 94 are substantially identical to steps 86, 88, 90 and 92 of control loop 70.

Once control loop 94 is completed for a particular cylinder of engine 12, this process will be repeated for that same particular cylinder based upon a predetermined repeat interval for each specific cylinder. This predetermined repeat interval can be based upon a specific predetermined period of time, a specific predetermined number of piston strokes, or some other engine parameter or other criteria such as every time such cylinder is fired. Regardless of how the repeat interval is determined, control loop 94 will trim each individual cylinder to the same desired detonation level and this will result in each cylinder being trimmed to substantially the same air/fuel ratio. ECM 40 will multiply the gaseous fuel admission valve control signal duration time for that particular cylinder by the computed trim value percentage for that particular cylinder and produce a trimmed control signal duration time. This results in all cylinders being balanced to a substantially identical air/fuel ratio.

Instead of trimming each individual cylinder to a predetermined detonation level, detonation control loop 94 can likewise be utilized to ensure that each individual cylinder does not exceed a predetermined threshold detonation level. In this particular situation, control loop 94 will not trim each individual cylinder to a specific detonation level, but instead, will ensure that the detonation level associated with each individual cylinder is below the threshold level. This alternative utilization of control loop 94 is illustrated in flowchart 112 of FIG. 4 and flowchart 112 can be inserted into loop 94 between points A and B as illustrated in FIG. 3. Once the actual detonation level of the cylinder under investigation is sensed and stored at step 96 of FIG. 3, the predetermined detonation level read by ECM 40 at step 98 of FIG. 3 will now represent a maximum threshold detonation level measurement for all cylinders of engine 12. Any detonation level occurring within any cylinder which is above the threshold level is undesired. At step 114 of FIG. 4, the actual detonation level of the particular cylinder under investigation is compared with the predetermined threshold detonation level to determine if the cylinder detonation level is greater than the predetermined level. If the actual detonation level of a given cylinder is greater than the predetermined detonation level, a trim value is generated for that particular cylinder in accordance with steps 100–110 of FIG. 3. The trim value so generated will trim that particular cylinder to the threshold detonation level or some predetermined detonation level less than the threshold detonation level based upon the particular programming of ECM 40. If it is determined at step 114 that the actual detonation level of a given cylinder is less than the predetermined threshold detonation level, no trim value will be generated and control loop 94 will end as indicated at step 116. Incorporation of flowchart 112 within control loop 94 between points A and B will therefore ensure that each cylinder is operating at or below the predetermined threshold detonation level established in step 98 of control loop 94.

The operating steps of flowchart 94 (FIG. 3) as well as flowchart 112 (FIG. 4) can be used separate and apart from the steps of flowchart 70 illustrated in FIGS. 2A and 2B for cylinder balancing purposes. In the case where the operating steps of flowchart 94 as set forth in FIG. 3 are utilized in their entirety, each of the cylinders of engine 12 will be balanced to a predetermined detonation level as previously explained, which process will likewise trim the air/fuel ratio associated with each such cylinder to substantially the same air/fuel ratio. In the case where the processing steps of flowchart 112 are incorporated within flowchart 94 as previously explained, all cylinders operating above the threshold detonation level will be trimmed to a detonation level which will be either equal to or less than the threshold level established at step 98.

It is also anticipated that the operating steps of flowchart 70 (FIGS. 2A and 2B) and flowchart 94 (FIG. 3), with or without the processing steps of flowchart 112 (FIG. 4) incorporated therewithin, could be operated simultaneously, control loop 70 trimming all cylinders to substantially the same cylinder exhaust port temperature and control loops 94 and 112 providing detonation control either with respect to a predetermined threshold detonation level (FIG. 4), or trimming each individual cylinder to substantially the same predetermined desired detonation level (FIG. 3). In this particular situation, the trim value produced from control loop 70 based upon desired cylinder exhaust port temperature will be compared with the trim value produced by control loop 94 and/or operating steps 112 incorporated therewithin as previously explained and the smallest of the compared trim values will be selected. This smallest or minimum compared trim value is then applied to the gaseous fuel admission valve control signal duration associated with the particular cylinder. In the case where the detonation control loop says subtract fuel from a particular cylinder and the exhaust port temperature control loop says add fuel to that particular cylinder, the detonation control loop will control and override the trim change called for by the exhaust port temperature control loop since detonation control will prevent cylinder damage. Performing control loops 70 and 94 simultaneously will achieve a substantially balanced air/fuel ratio in all cylinders based upon either a predetermined cylinder exhaust port temperature or a predetermined cylinder detonation level, and in the case of performing operating steps 114 and 116 in conjunction with control loop 94, the detonation level associated with each individual cylinder will likewise be kept below a predetermined threshold level.

INDUSTRIAL APPLICABILITY

The present invention provides for a method for balancing the air/fuel ratio to each individual cylinder of an engine based upon either cylinder exhaust port temperature and/or a predetermined detonation level for each individual cylinder.

An example of operation in accordance with one aspect of the present invention as set forth in FIGS. 2A and 2B wherein engine 12 is operated in its liquid fuel mode is explained with respect to the control diagram 118 illustrated in FIG. 5. As shown, the actual engine speed as sensed from engine speed sensor 54 is compared with the desired engine speed and governor 120 utilizes the error value computed therefrom to output a value (X) which is indicative of total fuel rate. Since engine 12 is operating in its liquid fuel mode, the total fuel rate represented by output value (X) will come solely from the liquid or diesel fuel being delivered to engine 12. Since the energy content of liquid fuel is substantially constant, the output value (X) is also indicative of a total fuel energy rate desired to be delivered to the engine. The necessary duration of the liquid fuel injector control signal corresponding to the output value (X) is determined at 122 as a function of liquid fuel rate or rack and engine speed such as through the use of a three-dimensional map or by making a calculation.

As a result of the operation of control loop 70, as likewise shown in control diagram 118, the actual cylinder exhaust port temperature is compared with a desired cylinder exhaust port temperature and an error value indicative of this comparison is generated at step 82 of control loop 70. Based upon this error value, a controller 124 within ECM 40 determines a distinct trim value for that particular cylinder based upon steps 84, 86, 88, 90 and 92 of flowchart 70 and such trim value is then applied to the diesel signal duration at 126. More particularly, the trim percentage value is multiplied by the liquid fuel injector control signal duration time at 126 and a control signal of the trimmed duration time is then inputted to the respective cylinder's liquid fuel injector 28 as previously explained. ECM 40 will effect delivery of each control signal to the respective fuel injectors 28 to deliver liquid fuel in amounts such that the air/fuel ratio associated with each individual cylinder will be balanced to the same common desired exhaust port temperature.

Figure 6:
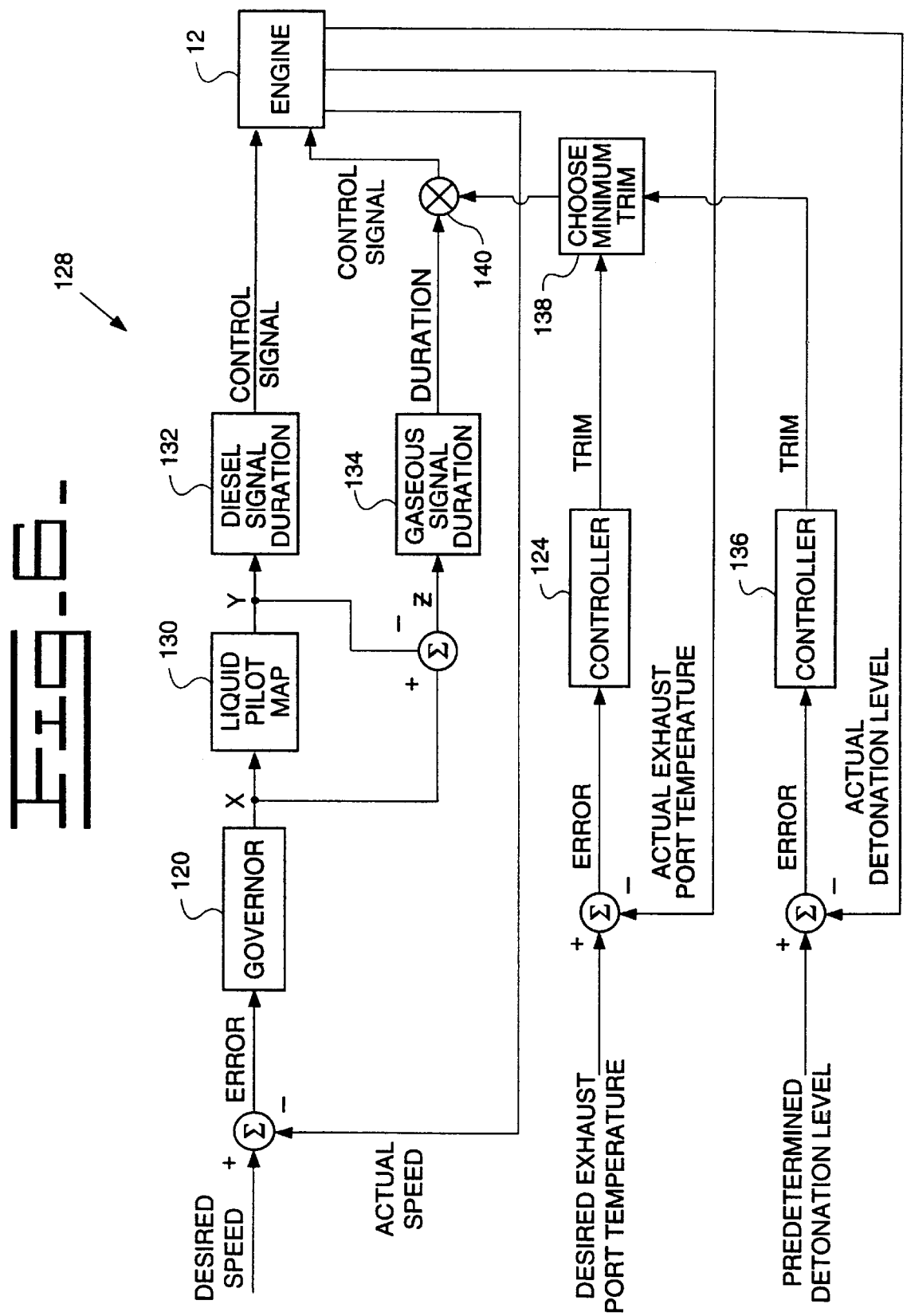
FIG. 6 is a control diagram of the present invention as illustrated in FIGS. 2, 3 and 4 when a dual fuel engine is operating in a dual fuel mode.

Control diagram 128 illustrated in FIG. 6 is likewise representative of the operation of control loops 70 and/or 94, with or without the inclusion of flowchart 112, when the dual fuel engine 12 is operating in its dual fuel mode. As shown, the actual engine speed as sensed from engine 12 is compared with the desired engine speed and governor 120, which could be a PID controller, utilizes the error to establish output value (X) which is indicative of total fuel energy rate. Liquid pilot fuel map 130 is then utilized to determine liquid pilot fuel rate value (Y). By subtracting liquid pilot value (Y) from value (X) the gaseous fuel value (Z) is determined. The necessary duration of a fuel injector control signal corresponding to liquid pilot value (Y) is determined as a function of rack and engine speed at 132, such as through use of a three-dimensional map or by making a calculation. A gaseous fuel admission valve control signal duration corresponding to gaseous fuel value (Z) is determined at 134 by an appropriate calculation which takes into account the gaseous fuel pressure, the intake air pressure, the gaseous fuel temperature, the stored gaseous fuel energy content value ($E_G$), and the known flow characteristics of gaseous fuel admission valve 30 in accordance with the following equation:

$$\text{GASDURATION}_Z = [(Z \ast K_1 \ast E_L)/(N_I \ast S \ast E_G \ast F_G)] + t_c$$

where Z (mm) is a rack value, $K_1$ (g/mm*min) is a predetermined constant for converting rack to a liquid fuel flow rate, $E_L$ (J/g) is the energy content of the liquid fuel, $N_I$ (inj/rev) is the number of injections per engine revolution, S (rev/min) is the engine speed, $E_G$ (J/g) is the stored gaseous fuel energy content, $F_G$ (g/sec) is the flow rate of the gaseous fuel admission valve, and $t_c$ (sec) is an offset to account for gaseous fuel flow when the gaseous fuel admission valve 30 is not fully open, that is when the gaseous fuel valve is opening and closing.

Since control diagram 128 represents operation of the dual fuel engine in its dual fuel mode, the gaseous fuel admission valve duration time may be modified at step 140 by any trim value correction produced as a result of the operation of control loop 70 and/or control loops 94 and 112. In this particular situation, as previously explained, the trim value produced by controller 124 within ECM 40 as a result of executing control loop 70 will be compared at control block 138 with any trim value generated by controller 136 within ECM 40 as a result of executing control loop 94, with or without inclusion of the operational steps illustrated in flowchart 112. As illustrated in FIG. 6, the actual detonation level of a particular cylinder is compared with a predetermined detonation level and the error value representative of this comparison as determined at step 102 in FIG. 3 is then utilized by controller 136 to determined a distinct trim value percentage which is compared with the trim value percentage produced by controller 124. For reasons previously explained, the smallest or minimum compared trim value is selected at control block 138 and this minimum compared trim value percentage is multiplied by the gaseous fuel admission control valve duration time at 140 to produce a control signal indicative of the trimmed duration time. This trimmed duration time is then applied to the cylinder's gaseous fuel admission valve 30 to adjust the gaseous fuel injector duration time for that particular cylinder and deliver the appropriate amount of gaseous fuel thereto.

Once the control signal durations are determined for each individual cylinder, ECM 40 effects delivery of each control signal to the appropriate gaseous fuel admission valves to deliver gaseous fuel in amounts such that the air/fuel ratio associated with each individual cylinder will be balanced as previously explained. In the event that control loop 94 is executed, with or without the operational steps illustrated in flowchart 112, independent of control loop 70, the trim value percentage generated by such detonation control loop will be inputted directly to the gaseous fuel admission valve duration signal at 140 and a control signal indicative of this trimmed duration time will be delivered to the appropriate gaseous fuel admission valves.

It is recognized that variations to the steps depicted in flowcharts 70, 94 and 112 could be made without departing from the spirit and scope of the present invention. In particular, steps could be added or some steps could be eliminated. All such variations are intended to be covered by the present invention. It is also recognized that in most applications an engine control system including ECM 40 will include a variety of other sensors and control apparatus.

Other aspects, objects and advantages of the present invention can be obtained from a study of the drawings, the disclosure and the appended claims.

What is claimed is:

1. A method for controlling the delivery of fuel to a plurality of cylinders associated with a dual fuel engine operating in a dual fuel mode, each cylinder including at least one gaseous fuel admission valve for delivering gaseous fuel to such cylinder, the method comprising the steps of:

(a) selecting at least one cylinder of said plurality of cylinders;

(b) sensing an actual detonation level of said at least one cylinder;

(c) comparing the actual detonation level of step (b) to a predetermined detonation level;

(d) determining a trim value based upon the comparison of step (c), said trim value being indicative of a gaseous fuel admission valve control signal duration adjustment factor;

(e) applying the trim value of step (d) to a determined gaseous fuel admission valve control signal duration for said at least one cylinder to establish a trimmed gaseous fuel admission valve control signal duration;

(f) delivering fuel to said at least one cylinder utilizing a gaseous fuel admission valve control signal having the trimmed gaseous fuel admission valve control signal duration of step (e); and (g) controlling the delivery of fuel to each of the remaining cylinders of the dual fuel engine in accordance with steps (a) through (f) for each remaining cylinder.

2. The method, as set forth in claim 1, wherein said predetermined detonation level is an average detonation level for all of said plurality of cylinders.

3. The method, as set forth in claim 1, wherein step (d) further includes:

limiting the trim value to a predetermined range so as to result in no more than a predetermined incremental change in gaseous fuel admission valve control signal duration.

4. The method, as set forth in claim 1, wherein steps (a) through (g) are repeated at predetermined intervals.

5. The method, as set forth in claim 1, wherein after completion of step (g), each cylinder of the dual fuel engine is balanced to approximately the same predetermined detonation level.

6. The method, as set forth in claim 1, wherein after completion of step (g), each cylinder of the dual fuel engine is balanced to a substantially identical air/fuel ratio.

7. The method, as set forth in claim 1, wherein step (c) includes:

setting the predetermined detonation level to a threshold level;

comparing the actual detonation level of step (b) to said threshold detonation level to determine if the actual detonation level is greater than the threshold level; and if the actual detonation level is greater than the threshold level, performing steps (d) through (f) for such cylinder.

8. The method, as set forth in claim 2, wherein if the actual detonation level is less than the threshold level, no trim value is determined and steps (d) through (f) are not performed for that particular cylinder.

9. The method, as set forth in claim 2, wherein after the performance of step (d), steps (e) through (g) are eliminated and the following steps are performed:

(h) sensing an actual exhaust port temperature for said at least one cylinder;

(i) comparing the actual exhaust port temperature of step (h) to a desired exhaust port temperature;

(j) determining a trim value based upon the comparison of step (i), said trim value likewise being indicative of a gaseous fuel admission valve control signal duration adjustment factor;

(k) comparing the trim value determined in step (j) with the trim value determined in step (d) and selecting the smallest of said compared trim values;

(l) applying the selected trim value of step (k) to a determined gaseous fuel admission valve control signal duration for said at least one cylinder to establish a trimmed gaseous fuel admission valve control signal duration;

(m) delivering fuel to said at least one cylinder utilizing a gaseous fuel admission valve control signal having the trimmed gaseous fuel admission valve control signal duration of step (l); and (n) controlling the delivery of fuel to each of the remaining cylinders of the dual fuel engine by performing steps (a) through (d) and steps (h) through (m) for each of said remaining cylinders.

* * * * *